United States Patent
Dai et al.

(10) Patent No.: US 10,168,917 B2
(45) Date of Patent: Jan. 1, 2019

(54) HOTNESS BASED DATA STORAGE FOR FACILITATING GARBAGE COLLECTION

(71) Applicant: International Business Machines Corporation, Armonk, NY (US)

(72) Inventors: Qiao Qing Dai, Shanghai (CN); Zhen Hua Feng, Shanghai (CN); Xu Chu Jiang, Shanghai (CN); Fei Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/090,706

(22) Filed: Apr. 5, 2016

(65) Prior Publication Data
US 2017/0285971 A1    Oct. 5, 2017

(51) Int. Cl.
*G06F 12/00* (2006.01)
*G06F 3/06* (2006.01)

(52) U.S. Cl.
CPC ............ *G06F 3/0616* (2013.01); *G06F 3/064* (2013.01); *G06F 3/0653* (2013.01); *G06F 3/0685* (2013.01)

(58) Field of Classification Search
CPC .... G06F 3/0616; G06F 3/0685; G06F 3/0653; G06F 3/064
USPC ......................................................... 711/103
See application file for complete search history.

(56) References Cited

U.S. PATENT DOCUMENTS

| | | | |
|---|---|---|---|
| 2008/0104357 A1* | 5/2008 | Kim ..................... | G06F 12/0246 711/170 |
| 2011/0258363 A1* | 10/2011 | Doatmas ............... | G06F 3/0616 711/103 |
| 2012/0137107 A1* | 5/2012 | Lee ..................... | G06F 12/0246 711/209 |
| 2012/0297122 A1* | 11/2012 | Gorobets ............ | G06F 12/0246 711/103 |
| 2013/0262533 A1* | 10/2013 | Mitra ................. | G06F 17/30132 707/822 |
| 2014/0289492 A1* | 9/2014 | Ranjith Reddy ..... | G06F 3/0613 711/170 |
| 2015/0212938 A1 | 7/2015 | Chen et al. | |
| 2016/0011971 A1* | 1/2016 | Lee ..................... | G06F 12/0246 711/103 |
| 2016/0054934 A1* | 2/2016 | Hahn ................... | G06F 3/0613 711/103 |
| 2016/0179386 A1* | 6/2016 | Zhang .................... | G06F 3/064 711/103 |
| 2016/0188455 A1* | 6/2016 | Patel ................... | G06F 12/0246 711/154 |
| 2017/0147217 A1* | 5/2017 | Chang ................. | G11C 11/5628 |

* cited by examiner

*Primary Examiner* — Tuan V Thai
*Assistant Examiner* — Tasnima Matin
(74) *Attorney, Agent, or Firm* — Peter J. Edwards

(57) ABSTRACT

Embodiments of the present disclosure relate to hotness based data storage for facilitating garbage collection. For target data to be stored into a flash drive, hotness of the target is determined, which indicates an expected update frequency of the target data. Then the in-use blocks in the flash drive are searched for a matching block for storing the target data, such that hotness of data being stored in the matching block matches the hotness of the target data. If no matching block is found, a free block is selected for storing the target data. The selection of the free block is based on the hotness of the target data and a degree of wear of the free block.

14 Claims, 5 Drawing Sheets

HOTNESS BASED DATA STORAGE FOR FACILITATING GARBAGE COLLECTION

BACKGROUND

The present disclosure relates to data storage, and more specifically, hotness based data storage for facilitating garbage collection in storage devices.

For flash drives such as solid state drives (SSDs), data is written in units called "pages." A page on these storage devices is generally erased before it can be rewritten. Usually, the erase operation can be executed on larger units of storage called "blocks," each of which is made up of multiple pages. When the data in one or more pages of a block is no longer needed, the block can be reclaimed by a garbage collection (GC) process which moves useful data in the other pages of that block into another previously erased block. Garbage collection is a fundamental process which has direct impact on the performance and endurance of the flash drives.

The garbage collection may be executed in a variety of ways. For example, when a data write request directed towards an invalid page of a block is received, the garbage collection may be initiated to move data in the valid pages to another empty block. The garbage collection may also be started, for example, when the drive I/O (Input/Output) is in an idle state and/or the percentage of invalid pages in a block exceeds a predefined value.

SUMMARY

Example embodiments of the present disclosure provide a method, a device, and a computer program product for hotness based data storage for facilitating garbage collection.

In an aspect, a computer-implemented method is provided. According to the method, expected hotness of target data to be stored on a flash drive is determined. The flash drive includes a plurality of blocks, where each block includes a plurality of pages. The hotness indicates a data update frequency. The method further includes searching the plurality of blocks for a matching block for storing the target data, such that the hotness of data being stored in the matching block matches the expected hotness of the target data. When a matching block is not found, a free block is selected from the plurality of blocks for storing the target data based on the expected hotness of the target data and a degree of wear of the free block, where the degree of wear is determined based on the hotness of data previously stored in the free block.

In another aspect, a device is provided. The device includes a processing unit and a memory coupled to the processing unit and storing instructions therein. The instructions can be executed by the processing unit to perform operations, including: determining expected hotness of target data to be stored on a flash drive, where the flash drive includes a plurality of blocks, each of the blocks includes a plurality of pages, and the hotness indicates a data update frequency; searching the plurality of blocks for a matching block for storing the target data, such that the hotness of data being stored in the matching block matches the expected hotness of the target data; and in response to missing the matching block, selecting a free block from the plurality of blocks for storing the target data based on the expected hotness of the target data and a degree of wear of the free block, where the degree of wear is determined based on the hotness of data previously stored in the free block.

In yet another aspect, a computer program product is provided. The computer program product is tangibly stored on a non-transient machine-readable medium and comprises machine-executable instructions. When executed on a device, the instructions cause the device to determine expected hotness of target data to be stored on a flash drive, where the flash drive includes a plurality of blocks, each of the blocks includes a plurality of pages, and the hotness indicates a data update frequency; search the plurality of blocks for a matching block for storing the target data, such that the hotness of data being stored in the matching block matches the expected hotness of the target data; and in response to missing the matching block, select a free block from the plurality of blocks for storing the target data based on the expected hotness of the target data and a degree of wear of the free block, where the degree of wear is determined based on the hotness of data previously stored in the free block.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Throughout the drawings, the same or similar reference numerals represent the same or similar elements.

Figure 1:
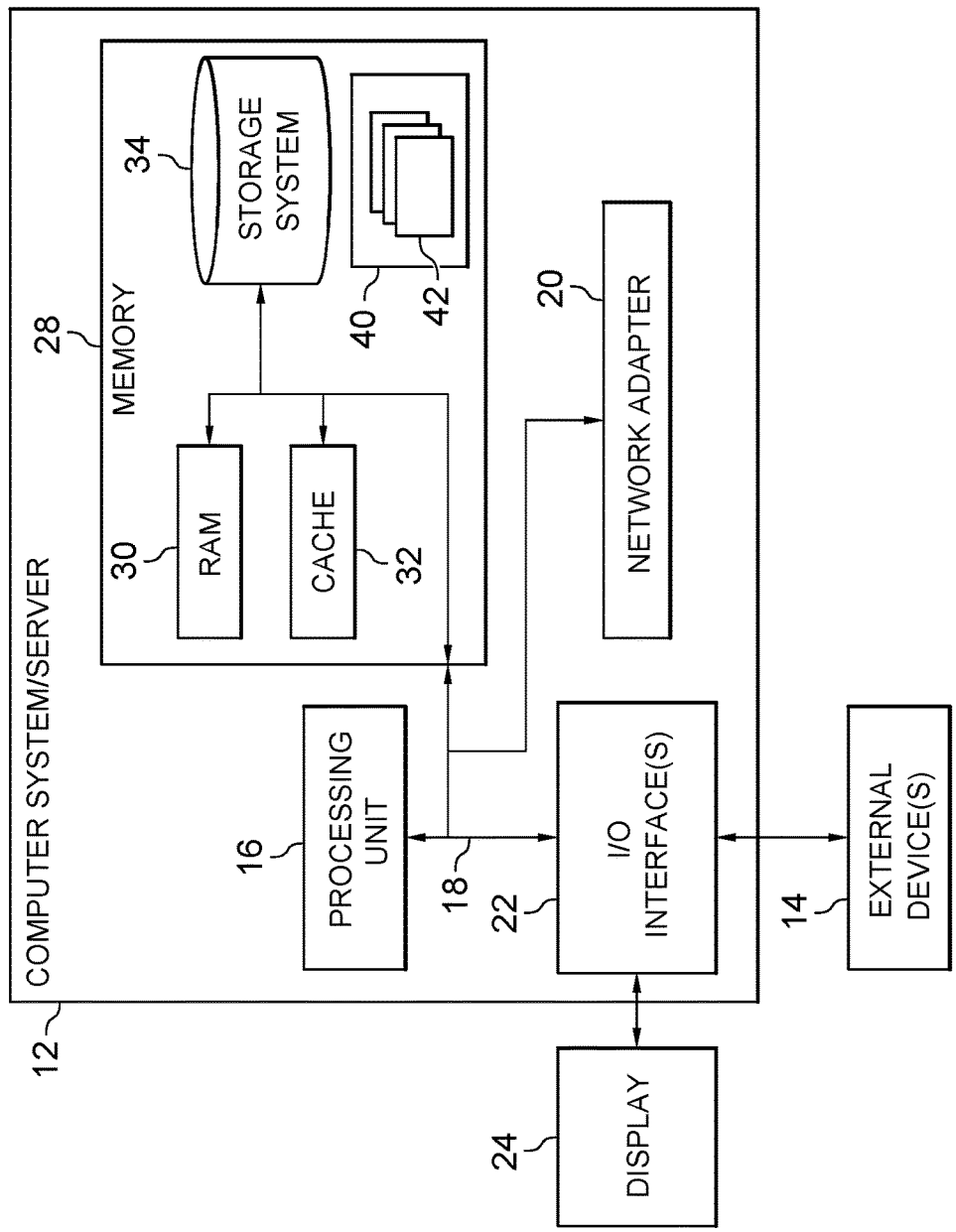
FIG. 1 depicts a block diagram illustrating a device suitable for implementing embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data storage, more particular aspects relate to hotness based data storage for facilitating garbage collection in storage devices. Principle of the present disclosure will now be described with reference to some example embodiments. It is to be understood that these embodiments are described only for the purpose of illustration and to help those skilled in the art understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Reference is first made to FIG. 1, in which an electronic device or computer system/server 12 which is applicable to implement the embodiments of the present disclosure is shown. The computer system/server 12 is only illustrative and is not intended to suggest any limitation as to the scope of use or functionality of embodiments of the disclosure described herein.

As shown in FIG. 1, computer system/server 12 may represent a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out (e.g., execute) the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to, microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

As discussed herein, garbage collection on a flash drive may be executed on units of storage called blocks. A block may be cleaned before it is written (or rewritten) with new data. Cleaning a block may include executing one or more operations to reset the contents of the block to a known state (e.g., reset all bytes in the bock to zero or one). As a result, if data in one or more pages of a block becomes invalid (e.g., because it was discarded, of is not long used, by a process or other computer program) while data in the other remaining pages remain valid, a garbage collection process may move the data stored in the valid pages to pages of another empty block.

Figure 2A:
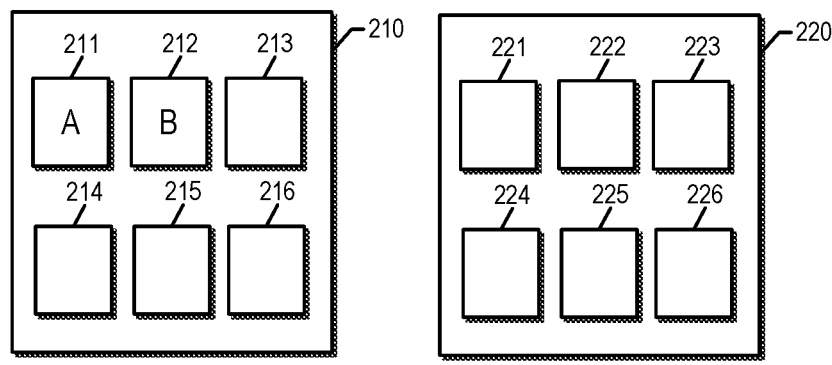
FIG. 2A depicts a schematic diagram illustrating a garbage collection process performed on a flash drive.
Figure 2B:
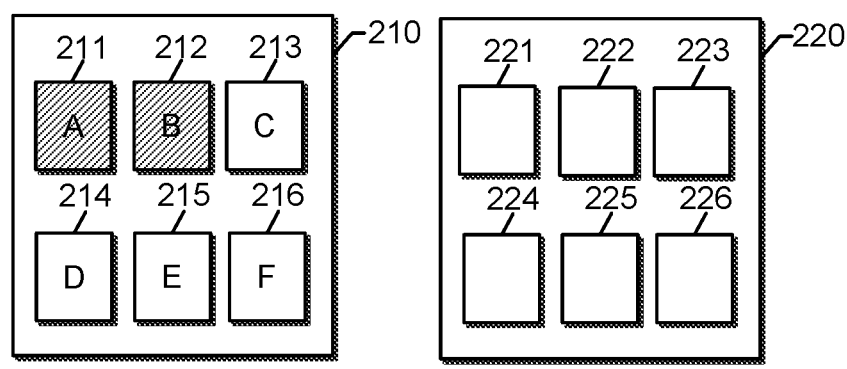
FIG. 2B depicts a schematic diagram illustrating a garbage collection process performed on a flash drive.
Figure 2C:
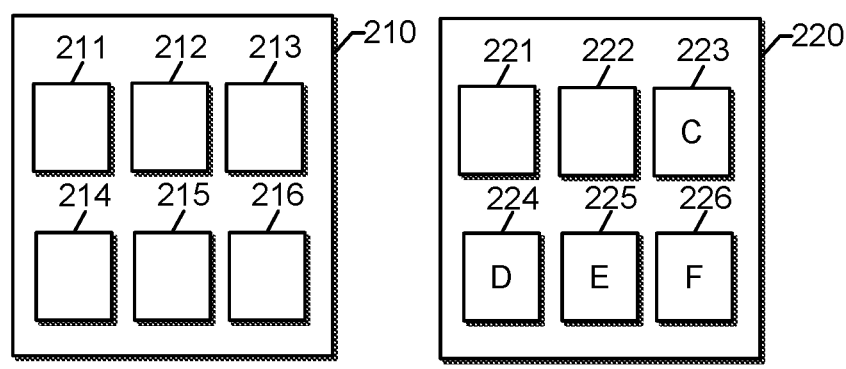
FIG. 2C depicts a schematic diagram illustrating a garbage collection process performed on a flash drive.

FIGS. 2A-2C show schematic diagrams of an example garbage collection process.

Referring now to FIGS. 2A-2C, in these figures, schematic diagrams of an example garbage collection process are illustrated. The example garbage collection process includes two blocks 210 and 220. The block 210 includes pages 211-216, and the block 220 includes pages 221-226. As shown in FIG. 2A, at a first time instant, data "A" and "B" is stored in the pages 211 and 212 of the block 210, respectively, while the other pages in block 210 (e.g., pages 213, 214, 215, 216) and block 220 (e.g., pages 221, 222, 223, 224, 225, and 226) remain free (e.g., in reset or unused state). At later second time instant (e.g., a time instant subsequent to the first time instant), as shown in FIG. 2B, the pages 211 and 212 are marked as invalid, for example, due to the update of data "A" and "B." In addition, data "C,"

"D," "E," and "F" have been stored in the pages 213-216, respectively. At this point, to reclaim the block 210 (e.g., to clean the block 210), garbage collection may first move (e.g., transfer) data "C," "D," "E," and "F" to pages of another free block. In the current example, the data "C," "D," "E," and "F" are moved to the pages 223-226 of the block 220, as shown in FIG. 2C. The block 210 may then cleaned and marked as a valid, free block which can be used to store new data.

Moving data across different blocks may incur I/O overhead costs (e.g., in terms of system resources or processing time) which may degrade the I/O performance of a flash drive. This impact on the flash drive performance may be alleviated by initiating the garbage collection (e.g., executing a garbage collection process) when the flash drive's I/O workload is relatively low (e.g., while the flash drive is idle). An effect of this strategy, however, may be that garbage collection is performed more frequently, thus shortening the lifetime of the flash drive. It may be possible to perform the garbage collection in response to the percentage of invalid pages in a block reaching an upper limit (e.g., a threshold value). The different update frequencies or "hotness" of various pieces of data may mean that, under this second strategy, it may take a long time for some blocks to reach the upper limit.

Embodiments of the present disclosure may alleviate these issues and other and other potential problems associated with flash drive management by providing a storage scheme based on data hotness. In some storage devices (or computing systems) data may be categorized as hot data and cold data. Instead of randomly storing data in blocks (e.g., selecting randomly available blocks to new store data), hot data and cold data may be separately stored in concentrated blocks. In this way, hot data which is updated to the same logical block address (LBA) invalidates pages sequentially in blocks. In case that no matching (e.g, the data hotness of a block to be written to a flash drive) block is found, degrees of wear of available (e.g., free) blocks will be obtained based on data hotness and then used in selecting blocks for storing new data. As a result, the garbage collection can be performed on a much smaller scope of blocks with densely populated invalid pages, thereby improving the performance of flash drives. Additionally, this technique may improve the endurance of the flash drives.

Figure 3:
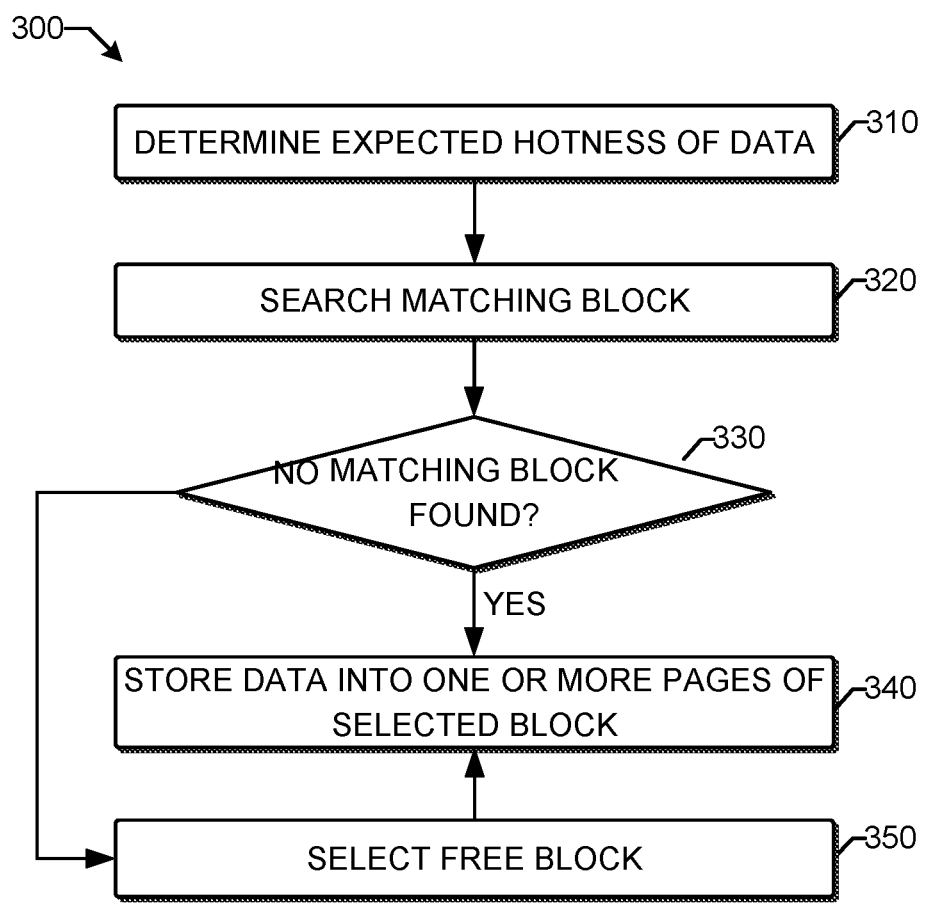
FIG. 3 depicts a flowchart illustrating a method for storing data in a flash drive in accordance with embodiments of the present disclosure.

Now some example embodiments will be described. FIG. 3 shows a method for storing data on a flash drive to facilitate garbage collection in accordance with example embodiments of the present disclosure. The method 300 may be executed by, for example, the flash drive or a controller thereof. As described herein, data may be stored on flash drive in units of pages. A flash drive block may include two or more pages. The flash drive garbage collection may be executed on individual, or collections of, blocks.

In step 310, expected hotness of data to be stored on the flash drive is determined. In the context of the present disclosure, the data to be stored can be referred to as "target data." As used herein, the term "hotness" refers to an indication of the data update frequency. That is, data that is expected to be updated relatively frequently may have a high hotness (e.g., a high hotness value). On the other hand, if the data is expected to be updated less frequently, may have a low hotness (e.g., a low hotness value). Data with high hotness can be referred to as "hot data," while the data with low hotness can be referred to as "cold data." The terms "hotness" and "update frequency" can be used interchangeably in the context of the present disclosure.

In some embodiments, the hotness of data may be represented qualitatively. The hotness of data, for example, may be represented by two or more hotness levels such as "very cold," "cold," "hot," "very hot," or the like. For example, the hotness level of given data may be determined by comparing the determined hotness with one or more thresholds. Alternatively, or in addition, the hotness of data can be quantitatively represented, for example, by two or more values such as "0," "1," "2," or the like. It is to be understood that the above examples are given merely for illustration without suggesting any limitation as to the scope of the present disclosure. The hotness of data can be represented in any suitable ways.

In accordance with embodiments of the present disclosure, the expected hotness of the target data can be determined in a variety of ways. For example, in some embodiments, the expected hotness may be determined according to predetermined historical hotness of the target data. The historical hotness indicates historical update frequency of the target data in a previous period of time. In some embodiments, the historical hotness can be determined by sampling the target data to determine the update number (e.g., the number of times the data was updated) or frequency within the given previous period of time. The previous time period is a time interval with a certain length prior to the current time point. Only by way of example, in one embodiment, the update number of the target data during the time period extending between 1:00 AM-2:00 AM on a previous day (e.g., yesterday) can serve as the historical hotness.

The historical hotness may be stored, for example, in a table. In some embodiments, the historical hotness may be dynamically updated at runtime. For example, the data stored on the flash drive may be periodically sampled to determine the usage patterns. A usage pattern indicates operations performed on the respective data. Examples of the operations include, but are not limited to, storing, deleting, updating, restoring, etc. Based on the usage pattern, it can be determined whether the update frequency of a certain type of data changes or varies over time. If the update frequency of a certain type of data does change over time, the historical hotness of the data may be updated accordingly. In this way, the expected hotness of the target data can be determined more precisely.

In step 310, the historical hotness may be retrieved from the table and used to determine the expected hotness of the target data. In some embodiments, the historical hotness can be directly used as the expected hotness of the target data. In other embodiments, the historical hotness may be used in connection with one or more other metrics. An example metric is recent hotness of the target data. The recent hotness indicates a recent update frequency of the target data in a recent period of time. Compared with the previous period of time for obtaining the historical hotness, this recent period of time is relatively close, or closer, to the current time point. Similar to the historical hotness, the recent hotness may be obtained by sampling the data. Only by way of example, the update number of the target data in the last hour may serve as the recent hotness.

The historical and recent hotness can be used in combination in any suitable way. In some embodiments, in step 310, a weighted average of the historical and recent hotness may be calculated as the expected hotness of the target data. In one embodiment, the weight for the historical hotness may be set higher than the weight for the recent hotness. In this way, the historical hotness, which is expected to be more stable than the recent hotness, can be used as a primary, or dominant, factor in determining the expected hotness of the target data. The recent hotness does not have to be used with the historical hotness. In some embodiments, it is possible to use the recent hotness alone (e.g., without the historical hotness) to determine the expected hotness of the target data. For example, in one embodiment, the recent hotness can be directly used as the expected hotness of the target data in step 310.

Next, the method 300 may be continued at step 320 to search the plurality of blocks in the flash drive for a block matching the hotness of the target data (e.g., a matching block). In accordance with embodiments of the present disclosure, the matching block is an active block which is currently in use and which stores data whose hotness matches the expected hotness of the target data as determined in step 310. Specifically, if the target data is hot data with the expected hotness above a threshold hotness and if there is an in-use block storing hot data, that block can be selected in step 320 as the matching block. Likewise, for cold target data with the expected hotness below the threshold hotness, the matching block is a block currently storing cold data.

In some embodiments, the hotness may be presented by different levels or values. In these embodiments, it is possible to calculate the matching degree between the target data and the blocks based on the hotness levels or values. For example, the average hotness levels or values of the blocks can be determined and then compared with the expected hotness of the target data. In this way, the "hotness matching degree" between each block and the target data can be obtained. The block with the highest hotness matching degree for the target data may be determined as the matching block. When there are multiple blocks having the same highest hotness matching degree for the target data, one of those blocks can be selected as the matching block according to one or more criteria. One example criterion is the number or ratio of the valid/invalid pages in the blocks. For example, it is possible to select a block with high ratio of invalid pages to improve the garbage collection efficiency which will be discussed below. Another example criterion is degrees of wear of the blocks which will also be discussed in the following paragraphs.

If it is determined in step 330 that a matching block is found, then the method 300 may be continued at step 340 to store the target data in one or more pages of the selected (or identified) matching block. In this way, hot data and cold data may be separately stored in respective concentrated blocks. This may improve the performance of garbage collection process because the garbage collection can be performed on a smaller scope (or selection) of blocks with densely populated invalidated pages. An example will be described below with reference to FIGS. 4A and 4B.

Figure 4A:
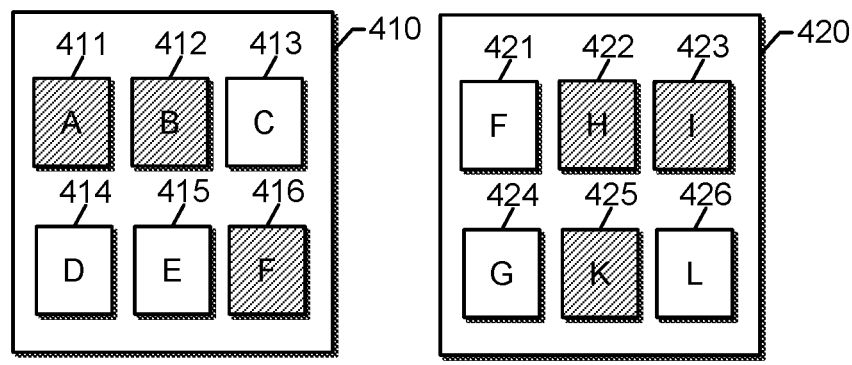
FIG. 4A depicts a schematic diagram illustrating data storage in a flash drive according to conventional storage scheme.

FIG. 4A is a schematic diagram of data storage in a flash drive. As shown, the block 410 includes pages 411-416 and the block 420 includes pages 421-426. For the purpose of illustration, in this example, the pages storing hot data are indicated by slash patterns. More particularly, the pages 411, 412 and 416 in the block 410 and the pages 422, 423 and 425 in the block 420 store hot data, while the other pages (e.g., pages 413, 414, and 415 of block 410 and pages 421, 424, and 426 of block 420) store cold data. In this example, the data is stored without considering the data hotness. That is, a block may include both pages storing hot data and pages storing cold data. Due to the high update frequency of hot data stored in blocks 410 and 420, at a later time instant when the hot data stored in the pages 411, 412, 416, 422, 423, and/or 425 become invalid and thus trigger garbage collection, the garbage collection process has to be performed on both block 410 and block 420. That is, the valid data stored in the pages 413-415, 421, 424, and 426 will be moved to pages of two additional free blocks (not shown).

Figure 4B:
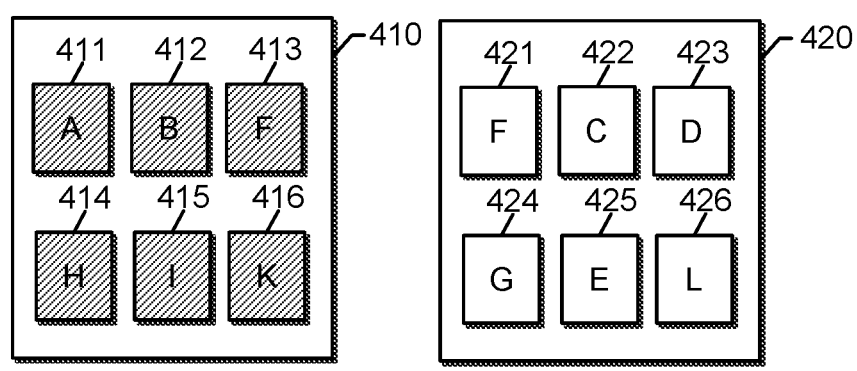
FIG. 4B depicts a schematic diagram illustrating data storage in a flash drive in accordance with embodiments of the present disclosure.

In accordance with embodiments of the present disclosure, the hot data and cold data may be separately stored, as described above. That is, some blocks may be dedicated to hot data while others may be dedicated to cold data. As an example, the pages 411-416 in the block 410 may each store hot data, while the pages 421-426 in the block 420 may each store cold data, as shown in FIG. 4B. Due to the high update frequency, at a later time instant when, for example, hot data in pages 411-416 (FIG. 4B) is updated, the block 410 (FIG. 4B) which may now be densely populated with invalidated pages may be reclaimed. In the meantime, the block 420 (FIG. 4B) storing cold data may not need garbage collection. As a result, only one additional block is needed to complete the garbage collection directed to the block 410 (FIG. 4B).

The garbage collection efficiency, denoted as $E_{GC}$, for a block can be defined as the ratio of the number of invalid pages in the block to the total number of pages in the block, as follows:

$$E_{GC} = \frac{\text{Number of Invalid Pages in the block}}{\text{Number of total pages in the block}}$$

By storing hot data and cold data in a concentrated fashion, the pages storing the hot data would probably soon become invalid. As a result, the $E_{GC}$ can be improved. In particular, when all pages in a block are invalid pages (such as the case shown in FIG. 4B), $E_{GC}=1$. At this point, the garbage collection efficiency is maximized.

Referring again to FIG. 3, if it is determined in step 330 that the blocks currently in use do not include a block matching the target data, then the method 300 may be continued at step 350 to select a free block for storing the data. In various embodiments, after a block is reclaimed by the garbage collection process, the block becomes a free block. Free blocks can be added to a free block pool (e.g., the collection of available or blocks on a flash drive). In accordance with embodiments of the present disclosure, in step 350, a suitable free block is selected from the free block pool based on the degrees of wear (e.g., the number of times a block has been written or erased) of the free blocks and the expected hotness of the target data.

Blocks that are frequently used to store hot data may be more likely to be worn than other blocks (e.g., blocks used less frequently to store hot data) due to the frequency operation on the hot data. In order to achieve wear leveling of the blocks, each block is assigned with a degree of wear which is determined based on the hotness of data previously stored in that block. For example, in some embodiments, the degree of wear of a block may be determined as the number of times that the block has been used to store hot data. The degree of wear can be an integer, for example. Each time hot data is stored into the block, the degree of wear increments by one. In some embodiments, the degree of wear of block may be managed in response to garbage collection. For example, when the block is reclaimed by the garbage collection process and marked as a free block, it can be determined whether the data currently stored in that block is hot data having hotness (e.g., expected hotness) above a threshold (e.g., a predefined threshold value). The degree of wear of the block increments may be incremented in response to determining that the data currently stored that the block has hotness above a threshold.

In step 350, the free block may be selected in such a way that the degree of wear of the free block is adapted to the expected hotness of the target data. In some embodiments, if the target data is determined to be hot data with the expected hotness above a threshold hotness, then a free block previously storing cold data may be selected in step 350. In this case, the degree of wear of the selected free block may lower than a predetermined degree of wear. On the other hand, if the target data is determined to be cold data with the expected hotness below a threshold hotness, a free block previously storing hot data may be selected in step 350. In this case, the degree of wear of the selected free block may be greater than a predetermined degree of wear. In this way, it is possible to prevent some blocks from always being used to store hot data, thereby achieving wear leveling of the blocks. The target data may then be stored in one or more pages of the selected free block in step 340.

In some embodiments, the threshold degree of wear may be adaptively determined according to the expected hotness of target data. When the expected hotness of the target data increases, the threshold degree of wear may decrease, and vice versa. In this way, it can be ensured that the blocks which are currently, or that previously have been, used to store very hot data can be used to store very cold data in the future, thereby lengthening the lifetime of the blocks.

Additionally, in some embodiments, the degrees of wear of the blocks can be also considered in the selection of matching blocks in step 320. For example, if two or more in-use candidate blocks are eligible for serving as the matching block, in one embodiment, the matching block can be selected based on the degrees of wear of the candidate blocks. For the target data with higher hotness, a candidate block with lower degree of wear can be selected as the matching block, and vice versa.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for operating a flash drive, comprising: determining expected hotness of target data to be stored in a flash drive according to a historical hotness of the target data and a recent hotness of the target data, the historical hotness indicating a historical update frequency of the target data in a previous period of time and the recent hotness indicating a recent update frequency of the target data in a recent period of time, wherein the recent period of time for the recent hotness is more recent than the previous period of time for the historical hotness, wherein the flash drive including includes a plurality of blocks, each of the plurality of blocks including a plurality of pages, and wherein hotness indicating indicates a data update frequency, wherein determining the expected hotness comprises: calculating a weighted average of the historical hotness and the recent hotness; searching the plurality of blocks for a matching block for storing the target data, the hotness of data being stored in the matching block matching the expected hotness of the target data, wherein the matching block is an active block, from the plurality of blocks, currently in use and with a highest hotness matching degree; selecting, in response to not finding the matching block, a free block from the plurality of blocks to store the target data to enable garbage collection in the flash drive, the free block being a block that has been reclaimed by a previous garbage collection, selecting the free block based on the expected hotness of the target data and a degree of wear of the free block, the degree of wear being determined based on the hotness of data previously stored in the free block; and storing the target data in the selected free block.

2. The method of claim 1, further comprising:
periodically determining a data usage pattern of the target data, the data usage pattern indicating operations performed on the target data; and
updating the historical hotness based on the data usage pattern.

3. The method of claim 1, wherein the degree of wear of the free block indicates a number of times that the free block has been previously used to store data with high hotness.

4. The method of claim 1, wherein selecting the free block comprises:
selecting, in response to the expected hotness of the target data exceeding a threshold hotness, the free block with the degree of wear below a threshold degree of wear; and
selecting, in response to the expected hotness of the target data being equal to or below the threshold hotness, the free block with the degree of wear exceeding the threshold degree of wear.

5. The method of claim 1, further comprising:
incrementing, in response to the previous garbage collection performed on a block of the plurality of blocks, the degree of wear of the block if a hotness of data currently stored in the block exceeds a threshold hotness.

6. A device comprising: a processing unit; a memory coupled to the processing unit and storing instructions thereon, the instructions, when executed by the processing unit, performing operations including: determining expected hotness of target data to be stored in a flash drive according to a historical hotness of the target data and a recent hotness of the target data, the historical hotness indicating a historical update frequency of the target data in a previous period of time and the recent hotness indicating a recent update frequency of the target data in a recent period of time, wherein the recent period of time for the recent hotness is more recent than the previous period of time for the historical hotness, wherein the flash drive including includes a plurality of blocks, each of the plurality of blocks including a plurality of pages, and wherein hotness indicating indicates a data update frequency, wherein determining the expected hotness comprises: calculating a weighted average of the historical hotness and the recent hotness; searching the plurality of blocks for a matching block for storing the target data, the hotness of data being stored in the matching block matching the expected hotness of the target data, wherein the matching block is an active block, from the plurality of blocks, currently in use and with a highest hotness matching degree; selecting, in response to not finding the matching block, a free block from the plurality of blocks to store the target data to enable garbage collection in the flash drive, the free block being a block that has been reclaimed by a previous garbage collection, selecting the free block based on the expected hotness of the target data and a degree of wear of the free block, the degree of wear being determined based on the hotness of data previously stored in the free block; and storing the target data in the selected free block.

7. The device of claim 6, the acts further comprising:
determining, periodically, a data usage pattern of the target data, the data usage pattern indicating operations performed on the target data; and
updating the historical hotness based on the data usage pattern.

8. The device of claim 6, wherein the degree of wear of the free block indicates a number of times that the free block has been previously used to store data with high hotness.

9. The device of claim 6, wherein selecting the free block comprises:
selecting, in response to the expected hotness of the target data exceeding threshold hotness, the free block with the degree of wear below a threshold degree of wear; and
selecting, in response to the expected hotness of the target data being equal or below the threshold hotness, the free block with the degree of wear exceeding the threshold degree of wear.

10. The device of claim 8, the acts further comprising:
incrementing, in response to the previous garbage collection performed on a block of the plurality of blocks, the degree of wear of the block if a hotness of data currently stored in the block exceeds threshold hotness.

11. A computer program product being tangibly stored on a non-transient machine-readable medium and comprising machine-executable instructions, the instructions, when executed on a device, causing the device to: determine expected hotness of target data to be stored in a flash drive according to a historical hotness of the target data and a recent hotness of the target data, the historical hotness indicating a historical update frequency of the target data in a previous period of time and the recent hotness indicating a recent update frequency of the target data in a recent period of time, wherein the recent period of time for the recent hotness is more recent than the previous period of time for the historical hotness, wherein the flash drive including includes a plurality of blocks, each of the plurality of blocks including a plurality of pages, and wherein hotness indicating indicates a data update frequency, wherein determining the expected hotness comprises: calculating a weighted average of the historical hotness and the recent hotness; search the plurality of blocks for a matching block for storing the target data, the hotness of data being stored in the matching block matching the expected hotness of the target data, wherein the matching block is an active block, from the plurality of blocks, currently in use and with a highest hotness matching degree; select, in response to not finding the matching block, a free block from the plurality of blocks to store the target data to enable garbage collection in the flash drive, the free block being a block that has been reclaimed by a previous garbage collection, selecting the free block based on the expected hotness of the target data and a degree of wear of the free block, the degree of wear being determined based on the hotness of data previously stored in the free block; and store the target data in the selected free block.

12. The computer program product of claim 11, wherein the instructions, when executed on the device, cause the device to:
determine, periodically, a data usage pattern of the target data, the data usage pattern indicating operations performed on the target data; and
update the historical hotness based on the data usage pattern.

13. The computer program product of claim 11, wherein the instructions, when executed on the device, cause the device to:
select, in response to the expected hotness of the target data exceeding a threshold hotness, the free block with the degree of wear below a threshold degree of wear; and
select, in response to the expected hotness of the target data being below the threshold hotness, the free block with the degree of wear exceeding the threshold degree of wear.

14. The computer program product of claim 11, wherein the instructions, when executed on the device, cause the device to: increment, in response to the previous garbage collection performed on a block of the plurality of blocks, the degree of wear of the block if a hotness of data currently stored in the block exceeds threshold hotness.

* * * * *